US006882974B2

(12) United States Patent
James et al.

(10) Patent No.: US 6,882,974 B2
(45) Date of Patent: Apr. 19, 2005

(54) VOICE-CONTROL FOR A USER INTERFACE

(75) Inventors: Frankie James, Sunnyvale, CA (US);
Jeff Roelands, San Jose, CA (US);
Rama Gurram, Cupertino, CA (US);
Richard Swan, Portola Valley, CA (US)

(73) Assignee: SAP Aktiengesellschaft, Walldorf (DE)

( * ) Notice: Subject to any disclaimer, the term of this patent is extended or adjusted under 35 U.S.C. 154(b) by 0 days.

(21) Appl. No.: 10/229,266

(22) Filed: Aug. 28, 2002

(65) Prior Publication Data

US 2003/0158736 A1 Aug. 21, 2003

Related U.S. Application Data

(63) Continuation-in-part of application No. 10/184,072, filed on Jun. 28, 2002.
(60) Provisional application No. 60/356,746, filed on Feb. 15, 2002.

(51) Int. Cl.[7] .......................... G10L 21/06; G10L 11/00; G10L 15/22
(52) U.S. Cl. ..................... 704/270.1; 704/275; 704/252; 704/251
(58) Field of Search .............................. 704/270.1, 270, 704/257, 235, 275, 251, 252, 9, 2; 345/746

(56) References Cited

U.S. PATENT DOCUMENTS

| 4,509,133 A | * | 4/1985 | Monbaron et al. ........... 704/251 |
| 4,783,803 A | * | 11/1988 | Baker et al. .................. 704/252 |
| 4,829,576 A | * | 5/1989 | Porter ......................... 704/235 |
| 5,289,375 A | * | 2/1994 | Fukumochi et al. ........... 704/9 |
| 5,799,279 A | * | 8/1998 | Gould et al. .................. 704/275 |
| 5,805,775 A | * | 9/1998 | Eberman et al. ............. 704/257 |
| 5,812,977 A | * | 9/1998 | Douglas ....................... 704/275 |
| 5,828,991 A | * | 10/1998 | Skiena et al. .................. 704/9 |
| 5,893,063 A | * | 4/1999 | Loats et al. .................. 704/275 |
| 6,192,343 B1 | * | 2/2001 | Morgan et al. ............. 704/275 |
| 2001/0043234 A1 | * | 11/2001 | Kotamarti .................... 345/746 |
| 2003/0125956 A1 | * | 7/2003 | Lewis et al. ................. 704/275 |
| 2003/0208352 A1 | * | 11/2003 | Lee ............................... 704/2 |

OTHER PUBLICATIONS

JustVoice™ ("Voice Recognition for MS Windows™95", Interactive Products Inc. © Jan., 1995).*
IBM™ ("Extension of H to Hawaii Keyboard Navigation", IBM™ Technical Disclosure Bulletin NN910864, Aug. 1991).*
James et al ("Speech, Voice And Translation: Voice And Translation: Voice Over Workplace (Vowp): Voice Navigation In A Complex Business GUI", Proceedings of the 5th International ACM Conference on Assistive Technologies, Jul. 2002).*
Conversa™ ("Surf The WEB With Your Voice", Product Packaging © 1998).*

* cited by examiner

Primary Examiner—Richemond Dorvil
Assistant Examiner—Daniel A. Nolan
(74) Attorney, Agent, or Firm—Fish & Richardson P.C.

(57) ABSTRACT

Method and systems to voice-enable a user interface using a voice extension module are provided. A voice extension module includes a preprocessor, a speech recognition engine, and an input handler. The voice extension module receives user interface information, such as, a hypertext markup language (HTML) document, and voice-enables the document so that a user may interact with any user interface elements using voice commands.

41 Claims, 11 Drawing Sheets

VOICE-CONTROL FOR A USER INTERFACE

CROSS-REFERENCE TO RELATED APPLICATIONS

This application is a continuation-in-part of U.S. application Ser. No. 10/184,072, filed Jun. 28, 2002, and titled "VOICE-CONTROLLED USER INTERFACES," which claims priority from U.S. Provisional Application No. 60/356,746, filed Feb. 15, 2002, and titled "VOICE CONTROLLED INTERFACE FOR WEB PORTALS," each of which is hereby incorporated by reference in its entirety for all purposes.

TECHNICAL FIELD

This invention is directed to a voice-controlled user interface, and, more particularly, to voice-controlled or voice-assisted techniques for data entry.

BACKGROUND

Much of software used in business today takes the form of complex graphical user interfaces (GUIs). Complex GUIs allow users to perform many tasks simultaneously while maintaining the context of the rest of their work; however, such systems are often mouse-and keyboard-intensive, which can be problematic or even impossible to use for many people, including those with physical disabilities. Voice interfaces can provide an accessible solution for physically disabled users, if steps are taken to address inherent usability problems, such as user efficiency and ambiguity handling. Additionally, voice interfaces may increase the efficiency of performing certain tasks.

Large resources have been expended to develop web-based applications to provide portable, platform-independent front ends to complex business applications using, for example, the hypertext markup language (HTML) and/or JavaScript™.

Because software applications have typically been developed with only the visual presentation in mind, little attention has been given to details that would facilitate the development of voice interfaces.

In most computer or data processing systems, user interaction is provided using only a video display, a keyboard, and a mouse. Additional input and output peripherals are sometimes used, such as printers, plotters, light pens, touch screens, and bar code scanners; however, the vast majority of computer interaction occurs with only the video display, keyboard, and mouse. Thus, primary human-computer interaction is provided through visual display and mechanical actuation. In contrast, a significant proportion of human interaction is verbal. It is desirable to facilitate verbal human-computer interaction to increase access for disabled users and to increase the efficiency of user interfaces.

Various technologies have been developed to provide some form of verbal human-computer interactions, ranging from simple text-to-speech voice synthesis applications to more complex dictation and command-and-control applications. The various types of verbal computer-human interaction applications may be described by two factors: (1) the presence or absence of a visual component; and (2) the extent to which the underlying application and interaction is changed when a voice interface is added.

Many research organizations building verbal human-computer interaction systems focus on the second factor: creating new interaction styles that may be used in conjunction with or in lieu of a visual display. For example, various organizations have created the following systems: CommandTalk; ATIS; TOOT; and ELVIS. Each of these systems focuses on providing improved models for verbal human-computer interaction, fundamentally changing the interaction style. For example, CommandTalk maintains a traditional GUI, while fundamentally changing the interaction style to improve usability. ATIS, an air travel information system, maintains a traditional visual component by presenting answers to user queries in a visual tabular format; however, ATIS modifies conventional interaction styles, moving from a database query interface to a natural language query interface. Similarly, TOOT, a train schedule information system, attempts to present tabular data to users; however, TOOT provides the tabular data by voice, eliminating the need for a visual component. Finally, the ELVIS system for accessing email messages by voice has been tested with several interaction styles, which differ from the visual interaction to varying degrees. The system-initiative style makes use of many of the same command names found in the visual interface, while providing a mixed-initiative style significantly changes conventional interactions.

Many commercial systems tend to maintain conventional interaction styles with varying degrees of visual components. Windows access tools such as ViaVoice™ and SUITEKeys mirror the keyboard/mouse interaction to a greater degree than any of the dialogue systems mentioned above. SUITEKeys even goes so far as to directly mimic the interaction of moving the mouse by hand and pressing individual keys. Similarly, many telephony applications mimic the keypad interaction directly with interactions that take the form of "press or say one."

Enormous resources have been used to develop business applications requiring complex GUIs to present large quantities of information, display complicated interactions within the information, and manage the complexity of maximizing user capability, configuration, and control. Existing applications provide limited support for controlling an application using voice. Some existing systems allow dictation or limited access commands; however, there is a need for systems and techniques to increase the extent of verbal human-computer interaction in conventional and legacy application to provide increased accessibility for disabled users and increased efficiency of interaction for all users.

SUMMARY

In one general aspect, a voice-enabled user interface includes user interface elements, and a speech recognition engine that receives voice input identifying a target user interface element. The voice-enabled user interface resolves ambiguities in associating the received voice input with the target user interface element using representational enumerated labels. The user interface elements include, for example, one or more of the following: a combo box, a text field, a list box, a button, a text area, a check box, or radio buttons. The speech recognition engine may receive voice input identifying a category of user interface elements.

In some implementations, the representational enumerated labels may be semi-transparent or opaque. Additionally, the voice-enabled user interface may resolve ambiguities in the received voice input using implicit scoping and/or visual cues. The user interface elements may be divided in one or more groups, such as, for example, areas of the screen. Implicit scoping may be implemented by prioritizing the groups of user interface elements. Visual cues may include colored highlights such as, for example, a color outline surrounding a user interface element.

In another general aspect, a representational enumerated label for resolving ambiguities in a voice-enabled interface includes a unique identifier, a corresponding user interface element, and a graphical representation. The graphical representation is presented in the voice-enabled interface to show its relationship to the corresponding user interface element. The unique identifier may be used to resolve ambiguities in the voice-enabled interface. The unique identifier may be, for example, a letter, number, or character.

In another general aspect, a method for resolving target ambiguity in a voice-enabled user interface includes receiving voice input ambiguously identifying a target user interface element, displaying representational enumerated labels corresponding to each potential target user interface element with each label including a unique identifier, and receiving voice input including the unique identifier of a representational enumerated label to resolve the target ambiguity.

In another general aspect, a voice-enabled user interface includes user interface elements, a data store, and a speech recognition engine. The data store records associations between user interface elements and grammars. The speech recognition engine receives voice input identifying a target user interface element, queries the data store to determine a grammar associated with the target user interface element, and processes data input using the determined grammar. The data store may be accessible by a single user or by multiple users. A single user may associate a data entry field with a grammar in a data store accessible by multiple users. Visual cues may be used to identify a data type or grammar associated with the target user interface element.

In another general aspect, a voice-enabled user interface includes user interface elements, and a speech recognition engine that receives voice input identifying a target user interface element. The voice-enabled user interface resolves ambiguities in associating the received voice input with the target user interface element using implicit scoping. User interface elements may be divided into one or more prioritized groups to provide implicit scoping.

The details of one or more implementations are set forth in the accompanying drawings and the description below. Other features and advantages will be apparent from the description and drawings, and from the claims.

DETAILED DESCRIPTION

A user interface to a software application or an electronic device may be improved by voice-enabling user interactions and data entry. Voice-enabled software applications may provide increased usability and efficiency for a user. Additionally, voice-enabled software applications may provide increased accessibility for physically disabled users.

The implementation described below illustrates techniques to voice-enable an electronic timekeeping system. In this implementation, the electronic timekeeping system is built on a web-based, client-server architecture. Those skilled in the art will appreciate that the described techniques are not limited to this implementation and may be used in any user interface.

Figure 1:
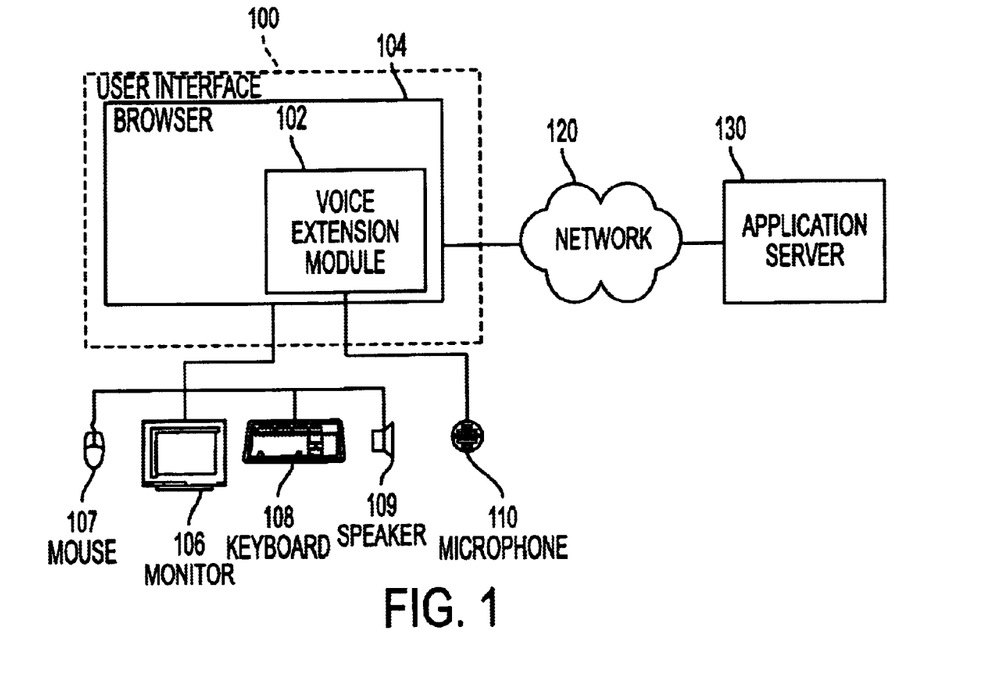
FIG. 1 is a block diagram of a voice-enabled computer application using a voice extension module.

Referring to FIG. 1, a voice-enabled computer interface 100 includes a voice extension module 102 and a browser 104. The browser implements the user input and output functionality, for example, using the following devices: a video display monitor 106; a mouse 107; a keyboard 108; and a speaker 109. The voice extension module 102 may receive input from a microphone 110. The browser 104 and/or the voice extension module 102 may receive user interface data across a network 120 (e.g., the Internet) from an application server 130.

In the implementation shown in FIG 1, application server 130 provides web-enabled user interface using Hypertext Markup Language (HTML) code to instruct browser 104 to display information and accept user input and commands. Browser 104 may be implemented using a conventional web browser, such as Microsoft® Internet Explorer™. Application server 130 sends HTML code describing various text, images, and user interface widgets to be displayed to the user. The HTML code, however, is first received and processed by voice extension module 102 to make the application voice-enabled.

A voice extension module 102 may be implemented as a Microsoft® Internet Explorer™ Browser Helper Object (BHO). A BHO acts as an extension of functionality to a browser and is used to intercept page and browser events before action is taken. This allows the voice extension module 102 to define and control the behavior of the browser 104 environment and the way in which events (e.g., mouse clicks, key presses) are handled. In addition, a BHO allows the voice extension module 102 to respond to external events, such as when a word is spoken, by embedding a speech recognition engine into the BHO. In this implementation, any speech recognition engine (e.g., a SAPI-compliant speech recognition engine) may be used to generate speech recognition events.

Figure 2:
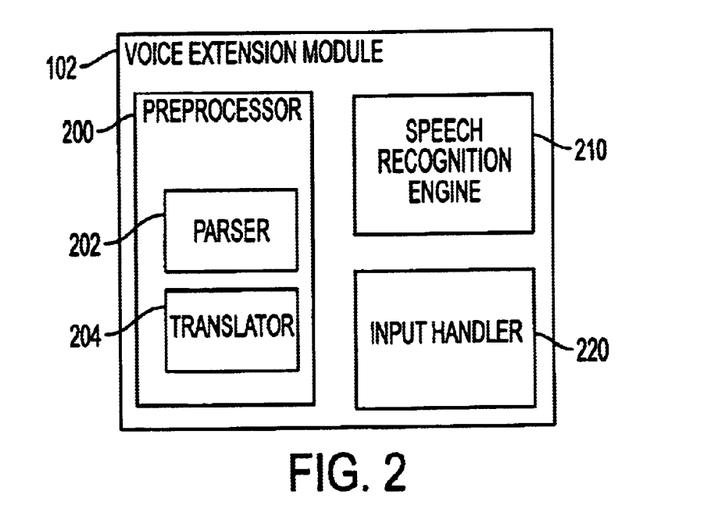
FIG. 2 is a block diagram of a voice extension module having a preprocessor, speech recognition engine, and input handler.

As shown in FIG. 2, one implementation of voice extension module 12 includes a browser 104 (with a preprocessor 200) that receives user interface information from an application server 130, for example, as HTML or JavaScript™ code, and preprocesses the user interface information to enable voice interaction before the page is displayed the user. The preprocessor 200 includes a parser 202 and a translator 204. The parser 202 identifies user interface elements within the code using any conventional parsing techniques, such as, a finite state machine.

For example, user interface information in the form of an HTML web page may include various widgets in the form of text fields, password fields, checkboxes, radio buttons, and control buttons (e.g., submit and reset). The parser 202 receives the user interface information and passes it to the translator 204 to properly register the relevant vocabulary with the speech recognition engine 210 and the input handler 220.

The translator 204 determines which of the identified user interface elements are "speakable." A vocabulary of speakable items is registered with the speech recognition engine 210 so that appropriate events are generated when the items are spoken. Additional changes may be made to the HTML or JavaScript™ running within the browser 104 before it is presented to the user, in order to make the pages more "voice-friendly." For example, translator 204 may add identifiers to elements. Some elements may include XML data or other metadata that indicates an appropriate voice identifier for the element. This metadata may determine an appropriate identifier that may be added to the element to make it more voice-friendly. Additionally, some identifiers may be abbreviated. For elements containing abbreviated identifiers, translator 204 may register the abbreviated identifier, the long form of the identifier, or both with the speech recognition engine 210. Finally, translator 204 may attempt to shorten long identifiers. One way to shorten long identifiers is to register only a portion of the long identifier. For example, if the identifier is "Submit Changes for Processing," it can be shortened to "Submit" or "Submit Changes."

Once a registered vocabulary item is spoken and recognized, the phrase is sent to input handler 220 which takes the appropriate steps to complete the action, save any necessary state, and perform additional tasks as defined by the behavior of the voice user interface or visual focusing used in the overall voice interface strategy. The input handler 220 helps to ensure that the same action is taken regardless of whether the source was the mouse or keyboard, or an equivalent voice command.

Figure 3:
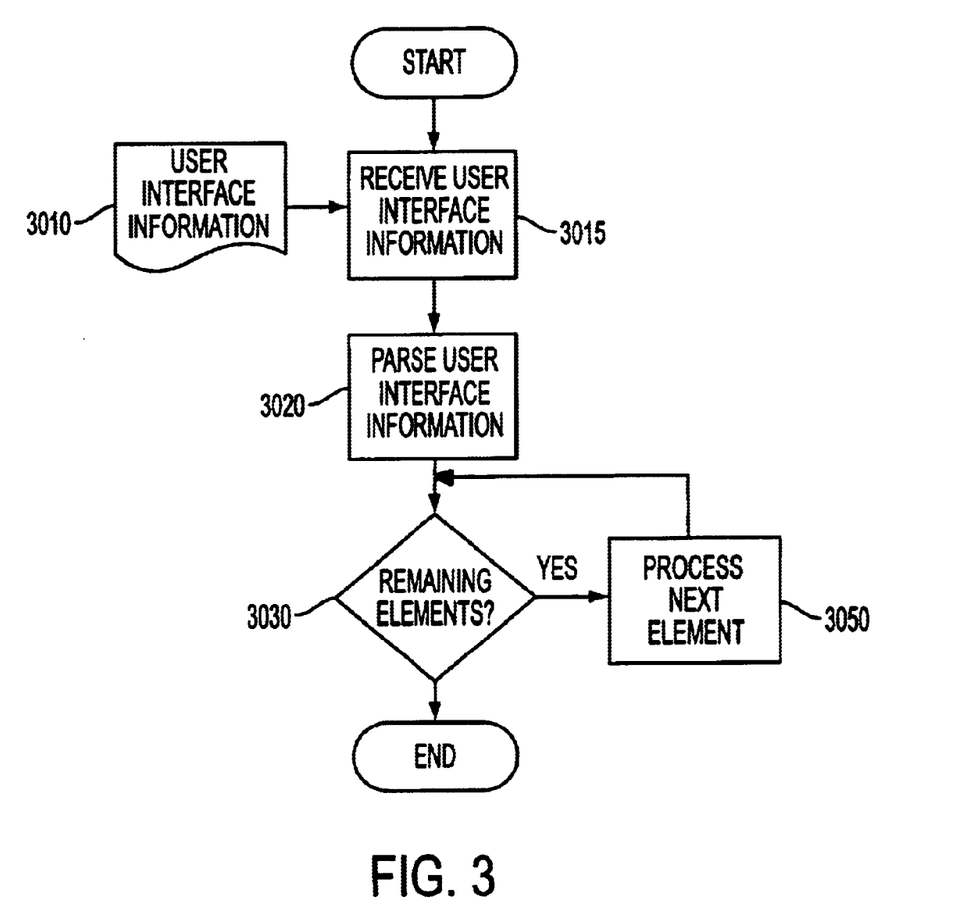
FIG. 3 is a flowchart showing a method of processing user interface information in a voice extension module.

Referring to FIG. 3, voice extension module 102 makes a user interface voice-enabled by first receiving user interface information 3010 describing the components of the interface manipulable by a user (step 3015). In this implementation, user interface information 3010 is represented as an HTML document that may include various user interface elements or widgets that may be controlled by a user. The user interface information 3010 also may include JavaScript™ code or any other control mechanism conventionally used by web browsers.

The user interface information 3010 is received by voice extension module 102 and then processed by preprocessor 200. The preprocessor 200 parses the received user interface information 3010 using parser 202 (step 3020). For each user interface element identified by parser 202, translator 204 processes the element to make it voice-enabled. As long as user interface elements are remaining (step 3030), the system processes the next element (step 3050). Once each user interface element has been processed, the user interface is displayed by the browser 104. Translator 204 processes each user interface element by registering appropriate vocabulary with the speech recognition engine 210 and by registering the user interface elements with input handler 220.

For example, the following user interface element may be received by voice extension module 102: "<INPUT TYPE= 'button'NAME='but_xyz' VALUE='save changes'>". This user interface element displays a button allowing a user to initiate saving changes. The translator 204 processes this element by registering "SAVE CHANGES" with the speech recognition engine 210. This would also be registered with the input handler 220 as a button field so that a user may access the field by stating "BUTTON." The input handler, receiving a button request, identifies all active buttons, allowing the user to select the desired button by number. This allows an alternate technique to access a named button element; however, this technique may be the only way to access unnamed button elements.

Data entry tasks incorporate many elements (or widgets) that require user control. Data entry is usually handled using a mouse and/or keyboard, and the intended target is generally easy to determine through the physical interaction component of the pointing device. In a voice interface, other focusing and selection techniques must typically be used to determine potential targets.

Many data widgets within applications, such as scroll bars, buttons, and text fields either do not have names (also referred to as unnamed elements, e.g., because they are associated with a particular unnamed table or row), have ambiguous names (e.g., because there is more than one field labeled as "ID number"), or appear to have names in the visual display, but are not easily associated with those names by the code, because the text appears in a completely different module from the widget.

One technique is to use implicit scoping in conjunction with a generic method for addressing data entry widgets. Implicit scoping is described in the following publication: James, F. and Roelands, J., Voice over Workplace (VoWP): Voice Navigation in a do Complex Business GUI. ASSETS 2002, (Edinburgh, Scotland, 2002). Briefly, implicit scoping prioritizes screen areas to minimize the potential for ambiguity. A user interface screen may be divided into several areas that are prioritized. User interactions and screen updates modify the prioritization to make user interfaces more voice-friendly.

Generic access to interface elements is provided by addressing elements by type. For example, to reach a text field in a given application, a user simply says "text field." If there is more than one text field in the current focus area, this is treated as any other ambiguity; overlaid labels are presented to allow the user to select the intended target. Although this approach makes most element selection into a two-step process, it does allow the user to navigate to any element on the screen efficiently. If the user does not wish to select one of the overlaid elements, the user may dismiss the icons by saying "cancel." Items that can be accessed by name (such as buttons) also may be accessed using this generic method, to ensure interface consistency and allow for alternatives in the case of degraded recognition performance.

Once an item has been selected, if it is an icon, button, radio button, or check box, the interface behaves as though the item has been clicked with the mouse. For combo boxes, the options in the list are displayed so that the user can make a selection. Text fields are highlighted with a colored border and the active cursor is placed in them, to signal that the user has entered data entry mode for that field.

An alternative solution to handling unnamed elements is to add unique names to all the elements when the page is first presented to the user, rather than requiring the user to first say the element type to cause the numbered overlaid labels to appear.

One problem associated with voice interfaces is distinguishing data entry from commands. For example, when a user selects a multi-line text field, it can be assumed that the user wishes to enter data entry mode and input some text. However, a technique to determine when that input is finished and the user is ready to resume navigation is needed. This may be accomplished in many ways.

For example, one option is to use an explicit command to end data entry. This requires the use of a code word or phrase, such as, "end data entry." For multi-line text fields where the user will want to have full edit control, this may be the best solution since large data entry tasks of this nature would then be treated as a separate mode that has to be manually exited.

A variant of this idea is to have the system listen for multiple keywords, such as the names of other targets in the interface. One way to accomplish this is to employ multiple parallel recognizers, with each recognizer listening for different keywords. This technique, however, increases the chance of misinterpreting data entry as a command and prematurely exiting data entry mode.

Similarly, a pause or timeout may be used to end data entry. Unfortunately this technique is often difficult for users because the end of data entry may be triggered by simply pausing to think about what to say next. This technique may be made more usable by providing visual cues to users.

Another option is to assign appropriate grammars to fields, to eliminate the need for dictation whenever possible. This technique is useful in situations where the field is expecting something specific, such as a date. However, it requires a way to determine the field's expected data type and the format for which the application expects the data to be presented. It will then need to assign a suitable grammar, potentially from a pool of common grammars, and also determine the appropriate formatting to be applied before entering the data into the element. Then, the system can automatically set the interface to expect to hear a particular type of entry once the field is selected, and return to the standard control mode once an entry is made.

A recognition grammar for a text field may also be chosen at run-time by the user using a method of "sticky grammar defaults." For example, the first time a user encounters a field, he can specify that a date grammar should be used. Then, on subsequent accesses of that field (even during different sessions), the system can default to the date grammar when the user is interacting with the same user interface element. In some implementations, sticky grammar defaults are saved as a file on the local computer independent from the source document, in much the same way that a browser may store websites visited, usernames, passwords, and other data. In one exemplary implementation, the file may be distributed to other users.

The sticky grammar method described above relies on the use of predefined grammars to improve speech recognition. A grammar is a specification of words and/or expected patterns of words to be listened for by a speech recognizer. For example, a date grammar may specify a month followed by a day followed by a year. A grammar for a combo box may include the options selectable in the combo box and, perhaps, some control phrases. By using grammars, the accuracy and efficiency of voice input increases significantly. This is because it is much easier to recognize which of ten words was spoken, rather than to determine which of thousands (or tens of thousands) of words was spoken.

Sticky grammars may be selected by a user and stored in a manner accessible by the voice extension module or browser. Sticky grammars may also be extended to support group, site, or global defaults for a given set of applications. For example, one user at a site could visit each web page to be regularly used at that site, choosing the appropriate grammars for user interface elements. The chosen grammars then may serve as sticky grammar defaults for future users.

The sticky default grammar for an interface element may also be chosen based on data entered into the user interface element. This can reduce the burden on users to individually tailor each screen. For example, if a particular application requires that a certain text field should read "Customer Name," then a specific input grammar for this field may be specified and provided as a sticky default. Regardless of the method used to determine when input will end, visual cues may be used to indicate to the user what mode he or she is in, and, perhaps, the expected grammar. For example, a blue border may be placed around the text field once it has been selected to indicate to the user that the system is expecting an entry for that field. Not only does this confirm the user's selection of a particular field, it also reminds the user that he or she must supply data for the field as the next action.

Different visual cues may also be used to provide an additional indication to the user that the data field is of a particular known type. For example, when a user interacts with a text box, the border color around the data field may be blue when a date field is encountered or green when a free text dictation field is entered. This could help the user by indicating the expected data type or format, when using sticky defaults. Additional commands may be available to the user to change the sticky default for a given field. A dialog box or other interaction methods may then be used to inform the user of what data types are available and to allow them to choose the most appropriate.

Figure 4:
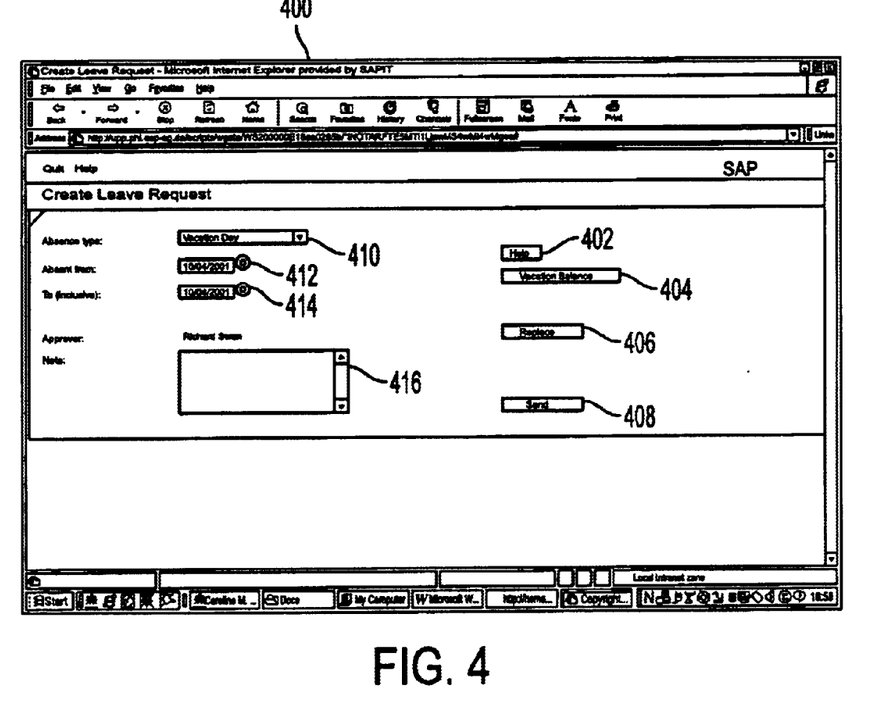
FIG. 4 is a screenshot showing a leave request application.

FIG. 4 illustrates an exemplary business application user interface to a leave request application using the techniques described above. The buttons on screen 400 (help button 402, vacation balance button 404, replace button 406, and send button 408) may be activated by speaking their names. Ideally, the remaining user interface elements also would be accessible by stating their names; however, it is often difficult or impossible to associate the appropriate text with the interface element. For example, remaining fields (absence type field 410, absent from field 412, absent to field 414, and note field 416) may include embedded labels or names that differ from text placed near the fields. The note field 416, for example, may be defined using the following HTML code: "<TEXTAREA NAME='ABNOTE' ROWS=4 COLS=20>". Sometimes it is not possible to associate a field with a label on the screen just by parsing HTML code. For example, it would be difficult for the system to associate the "Note" text with note field 416. In such cases, the creator of the web page can include XML or other metadata so that the system can determine an appropriate voice identifier for the field.

The absence type field 410 uses a drop-down list (combo box) for data entry. To focus on this particular item, the user says "combo box." This in general will number all combo boxes with transparent overlays to allow user selection. Since there is only one combo box in this screen, focus is automatically moved to it. The list is highlighted and the available choices are displayed. The default will be for the system to interpret the next command as an option from the list.

The absent from field 412 and absent to field 414 are both basically text fields that have associated info buttons allowing selection from another widget, in this case, a calendar. If the user wants to enter text into these fields, he can say "text field." This will cause transparent overlays (that include an identifiable character or number) to be displayed for all three text fields: the two text fields related to dates and also the text field for notes. The user selects a number to choose the desired field. At this point, the text field will be in focus and the user can dictate in the appropriate date.

The note field 416 may be similarly activated using voice commands; however, the text area also includes a scroll bar. Thus, when note field 416 is activated, a scroll bar voice command is available allowing the user to scroll up and down within the activated note field 416.

Figure 5:
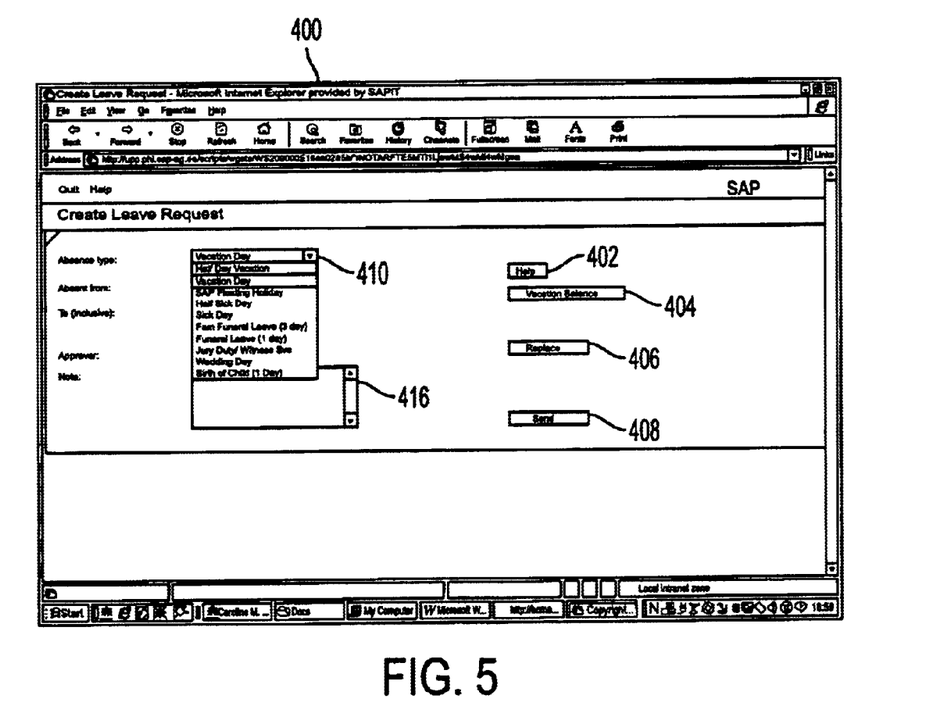
FIG. 5 is a screenshot showing a leave request application illustrating list selection.

FIG. 5 illustrates screen 400 after the user says "combo box." The field is activated with a visual cue, in this case, a blue box surrounding the field, and the available options are shown to the user. The user may then select an option by reading the displayed text. For example, the user may say "wedding day" or "sick day" to select the corresponding option.

The user may then enter dates in the absent from field 412 and absent to field 414 by saying "text field." This causes the three text fields to be numbered or otherwise highlighted on the screen so that the user may then select the desired text field. For example, the system may place a transparent overlay on the three text fields, with each overlay indicating a number. The user may then read the number to select the desired field.

The user may interact with the system to enter a date by saying "text field" and then "one" to shift the focus to the "absent from" field 412. Then, the user may indicate the date by saying "October Fourth Two Thousand One." The speech recognition engine 210 may use a date recognition grammar registered by translator 204 to recognize voice input. The translator 204 then formats the recognized numbers in the appropriate date format for use by the application.

Figure 6:
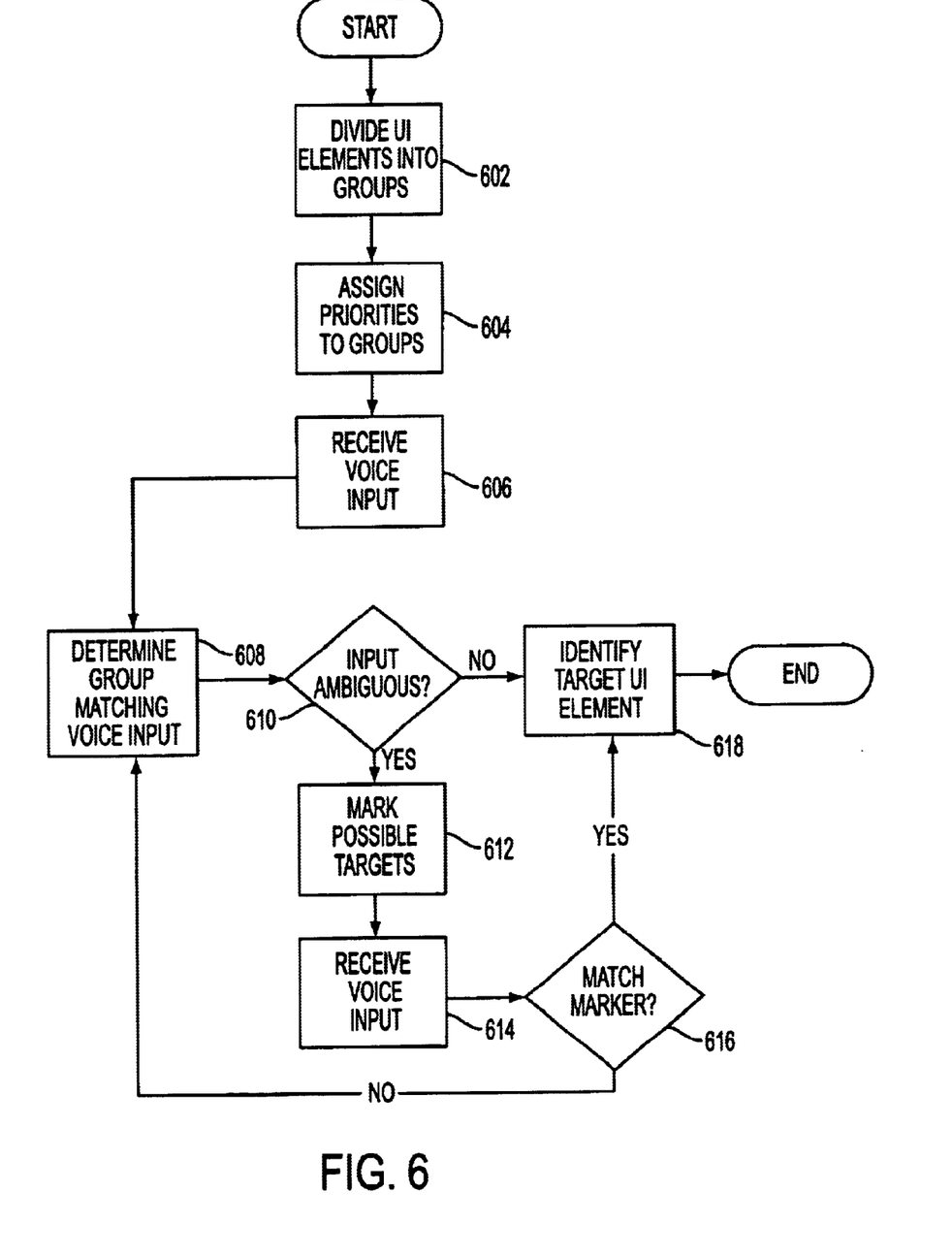
FIG. 6 is a flowchart showing the use of implicit scoping to resolve target ambiguities in a voice interface.

FIG. 6 illustrates a voice-enabled system. Complex voice-enabled applications sometimes have difficulty resolving ambiguities in a user's actions. In a physical interaction with a mouse or other pointing device, users specify the focus of their actions directly by clicking on the item of interest. In a voice-enabled application, it is not always easy to uniquely identify each user interface element. For example, a user interface may include multiple buttons labeled "Search" or multiple text fields with no easy identifiers. This ambiguity is sometimes referred to as target ambiguity because the target of a user's action is ambiguous and must be resolved.

The voice-enabled system uses three techniques to resolve target ambiguities: (1) visual cues identify the current focus area; (2) implicit scoping prioritizes screen areas to minimize the potential for ambiguities; and (3) representational enumerated labels allow users to resolve ambiguities explicitly. Individually, or in combination, these techniques, described in detail below, may reduce or eliminate target ambiguities in voice-enabled interfaces.

Visual cues include any visual indicator used to reduce target ambiguity. For example, a screen area or a user interface element may be highlighted, outlined, or otherwise visually identified as the preferred or expected target. Target ambiguities may then be resolved in favor of the screen area or user interface element indicated by a visual cue.

Implicit scoping reduces target ambiguities by dividing and prioritizing portions of the user interface. A complex user interface may include several components including a navigation bar, header bar, and one or more application screen areas. For example, a portal web page may include a navigation bar on the left side of the screen, a header bar at the top, and several application screen areas where each application screen area provides an interface for performing different tasks. The various screen areas may be implicitly scoped by prioritizing each area.

Screen area priorities may be explicitly stated by the developer of the user interface or they may be automatically chosen based on some heuristics. For example, screen areas may be prioritized in the following order: (1) the application screen areas prioritized from top to bottom, left to right; (2) the navigation bar; and (3) the header bar. Thus, target ambiguities between the navigation bar and the header bar are resolved in favor of the navigation bar. Similarly, ambiguities between the navigation bar and an application screen area are resolved in favor of the application screen area.

Finally, representational enumerated labels may be used to resolve ambiguities that cannot otherwise be resolved. Using this technique the voice-enabled interface identifies each possible target in response to user voice input. The possible targets are enumerated and identified to the user so that the user may select the desired target. For example, if three text fields are possible targets, the targets may be numbered "1," "2," and "3." The numbers are indicated in the interface so that the user may then choose which text field is the desired target.

The representational enumerated labels may be semi-transparent overlays placed over the corresponding user interface elements. Using semi-transparent overlays allows the voice-enabled interface to identify the potential targets without substantially affecting the presented interface, as users may view the underlying interface information through the semi-transparent overlay.

Referring to FIG. 6, implicit scoping may be implemented by dividing user interface elements into one or more groups (step 602), such as, for example, screen areas. Each group is assigned a relative priority to be used in resolving ambiguities (step 604). For example, each group may be assigned a number from one to ten with one being the highest. Only those user interface elements from the highest possible group is used. Thus, ambiguities may be at least partially resolved by ignoring lower priority groups of user interface elements.

The voice interface receives a voice input (step 606) and determines the highest priority group with targets matching the voice input (step 608). If ambiguities still exist in the highest priority group with a match (step 610), the system marks possible target user interface elements (step 612). Ambiguities may still exist, for example, if the voice input is "text field" and multiple text fields exist in the highest priority group. Additional voice input is received by the system (step 614). If the voice input matches one of the marked possible target user interface elements (step 616), then the target is identified (step 618) and the process ends.

If the additional voice input does not match one of the marked target user interface elements (step 616), then the system checks to see if input matches another user interface element (step 608). If the input is not ambiguous (i.e., uniquely identifies a user interface element in the highest priority group with a match), then the target user interface element is identified (step 618) and the process ends.

Figure 7:
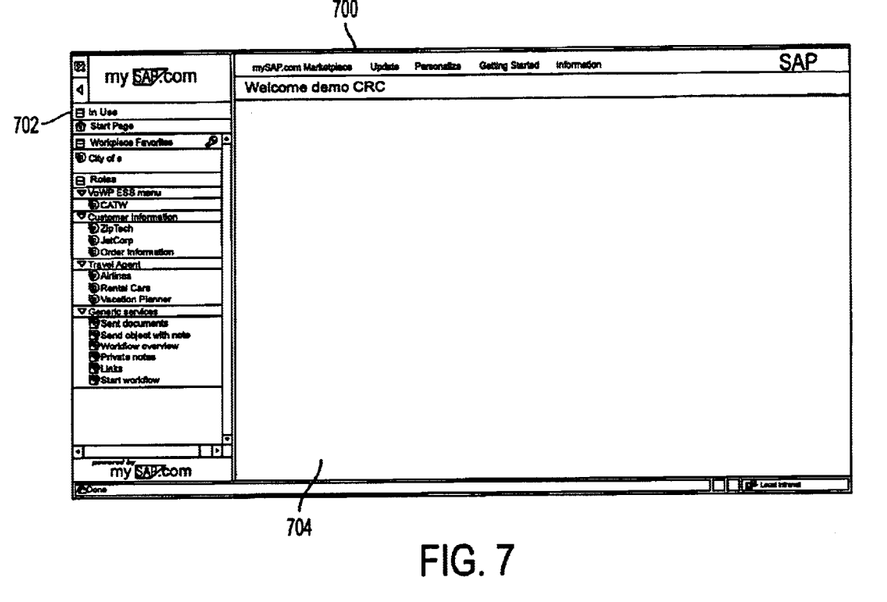
FIGS. 7–18 are screenshots of a voice-enabled electronic timekeeping system using implicit scoping, visual cues, and representational enumerated labels to resolve target ambiguities.
Figure 8:
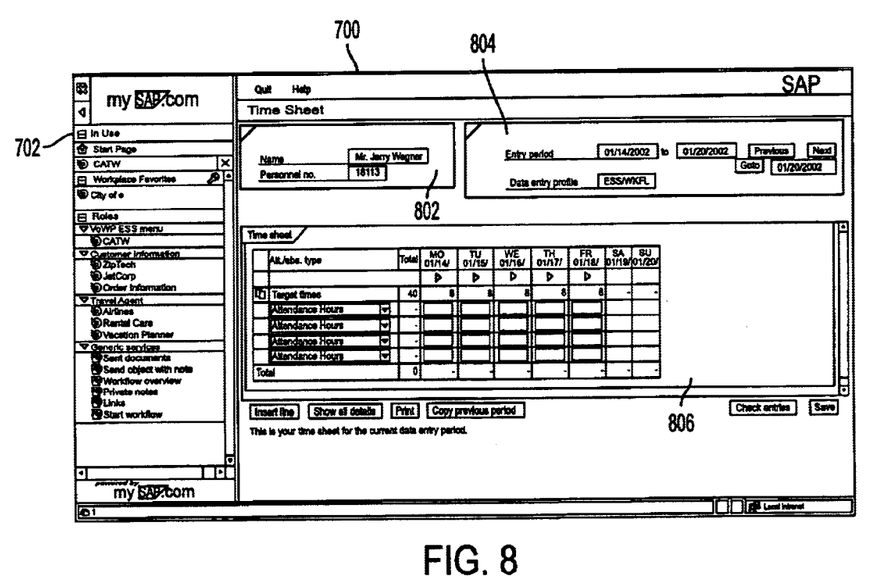

FIGS. 7–17 describe a voice-enabled electronic timekeeping application using visual cues, implicit scoping, and representational enumerated labels to resolve target ambiguities. In FIG. 7, a web portal allows a user to select various applications. The application window 700 includes two screen areas: a menu area 702 listing the various applications and a display area 704. The menu 702 is subdivided into several areas including a "Roles" allowing a user to select tasks based on several indicated roles. The application begins with the focus area set to the "Roles" menu. The focus area may be indicated by a visual cue such as, for example, a colored line surrounding the focus area. The user may select to begin the electronic timekeeping application (named "CATW") by speaking "CATW." This command initiates the application using display area 704 as shown in FIG. 8.

Referring to FIG. 8, the electronic timekeeping application includes three general components that are displayed in display area 704. These components include the following:

a user identification component 802, a time period component 804, and a time entry component 806. The user identification component 802 lists the user's name and personnel number. The time period component 804 lists the displayed time period and allows the user to switch to other time periods. The time entry component 806 allows a user to modify and/or enter time for the time period indicated by the time period component 804. The visual cue is moved to the display area 704 indicating that this area now has priority for ambiguity resolution and command interpretation.

The time entry component 806 includes what looks like a spreadsheet with columns indicating the days in the time period and rows indicating various categories of time entry, such as, for example, annual leave, attendance hours, business trip, compensation flex time, compensation overtime, education/training, family medical leave, holiday, jury duty, long term disability, meeting, personal time, severance pay, or short term disability. Various text fields corresponding to each row/column combination are available for data entry; however, no obvious mechanism is available for users to easily identify a desired target text field.

Figure 9:
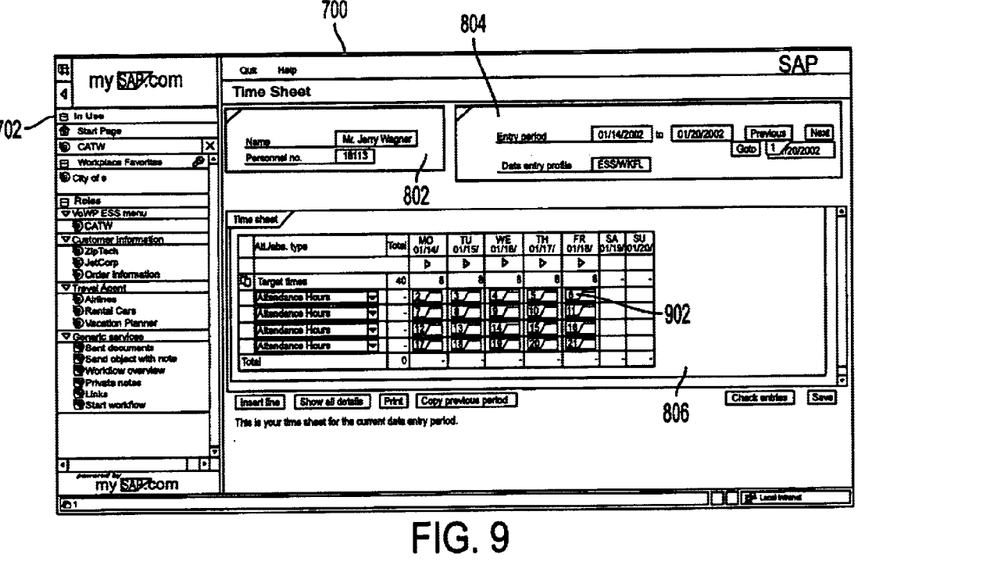

Referring to FIG. 9, a user desiring to enter text in the upper leftmost text field of the time entry component 806 may say "text field." The system may use a prioritization scheme for example to split the left-hand frame from the right-hand frame and only apply the representational enumerated labels to the right-hand frame containing potential target text fields. Because the system is unable to resolve the ambiguity using prioritization alone, each possible text field within the frame given priority is indicated by a representational enumerated label 902 (pointing to one of the 21 displayed representational enumerated labels). Label "1" is placed in the text field in the time period component 804. The remaining labels "2–21" are placed in the text fields of the time entry component 806. The user may identify the target text field by speaking its corresponding number.

Figure 10:
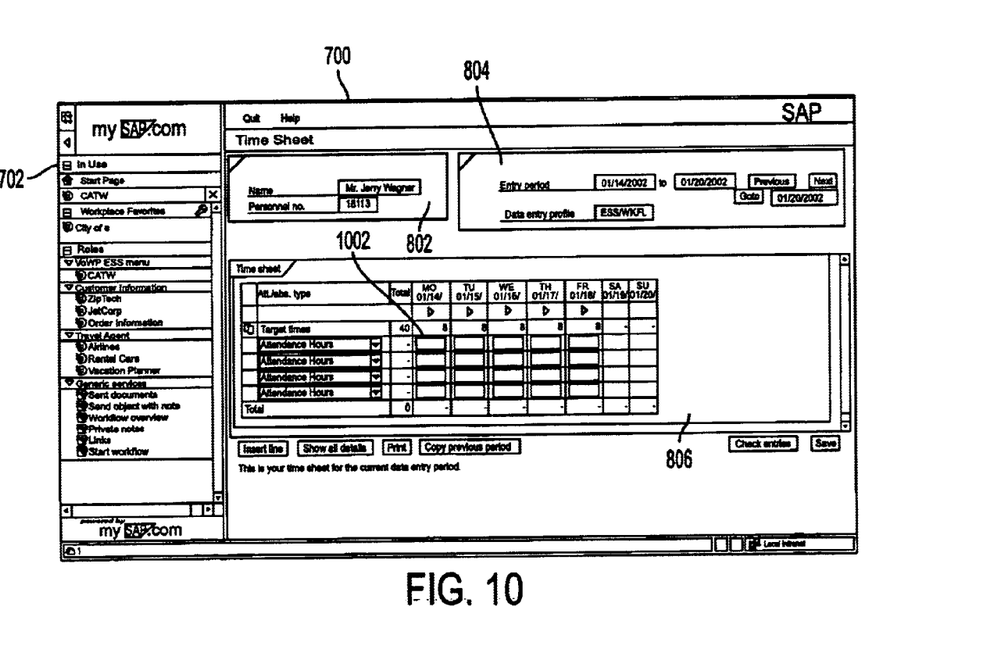

Referring to FIG. 10, the user selects the upper leftmost text entry field 1002 in the time entry component 806 by saying "two." After the user input is received, the representational enumerated labels disappear and the system prepares for data entry in the text field 1002 by entering a data entry mode. A blue outline serves as a visual cue to indicate to the user that the system is in data entry mode and will enter any data entry in the text field with the blue outline.

Figure 11:
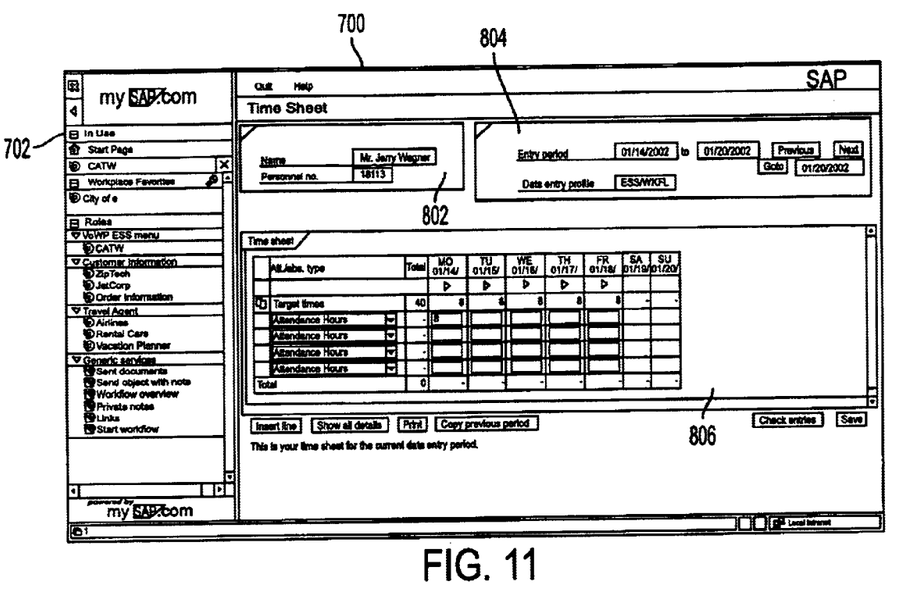

Referring to FIG. 11, in data entry mode, the system may use an assigned grammar to improve speech recognition performance. The electronic timekeeping application expects users to enter the number of hours worked in each text field of the time entry component 806, so a grammar may be assigned to those text fields that recognizes numbers. The user may then dictate the contents of the text field by saying the desired number. In this example, the user speaks "eight" and the system enters the number eight into the text field 1002 and exits data entry mode.

Figure 12:
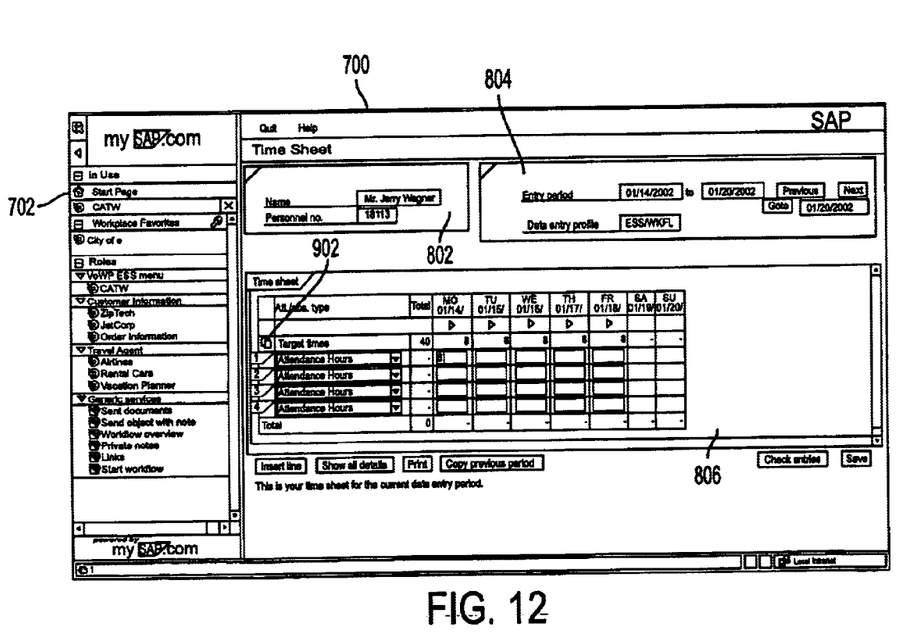

Referring to FIG. 12, a similar technique may be used to interact with the combo boxes used to select time categories in the time entry component 806. A user wishing to change a category from "Attendance Hours" to "Holiday" may do so by speaking "combo box." The request is ambiguous because there are four possible combo boxes available for data entry, so the system displays representational enumerated labels 902 to allow the user to resolve the ambiguity. The combo boxes are labeled one through four to allow the user to identify the desired target.

Figure 13:
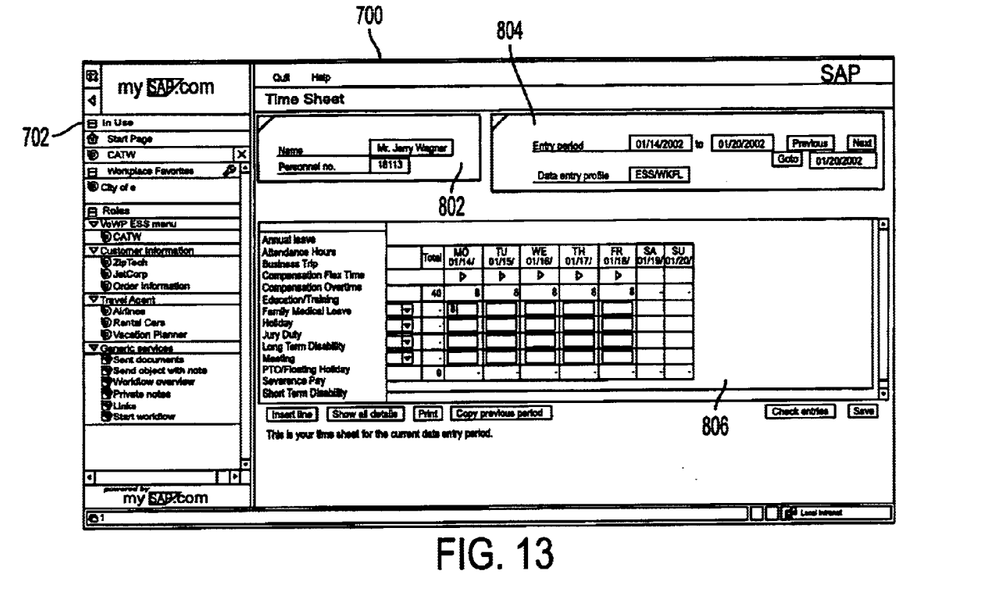

Referring to FIG. 13, the user selects a combo box by speaking the number of the corresponding representational enumerated label 902. In this example, the user speaks "two," the labels are removed, and the second combo box is opened for data entry, displaying the list of choices selectable by the combo box. The user may then select the desired choice by reading the desired choice.

Figure 14:
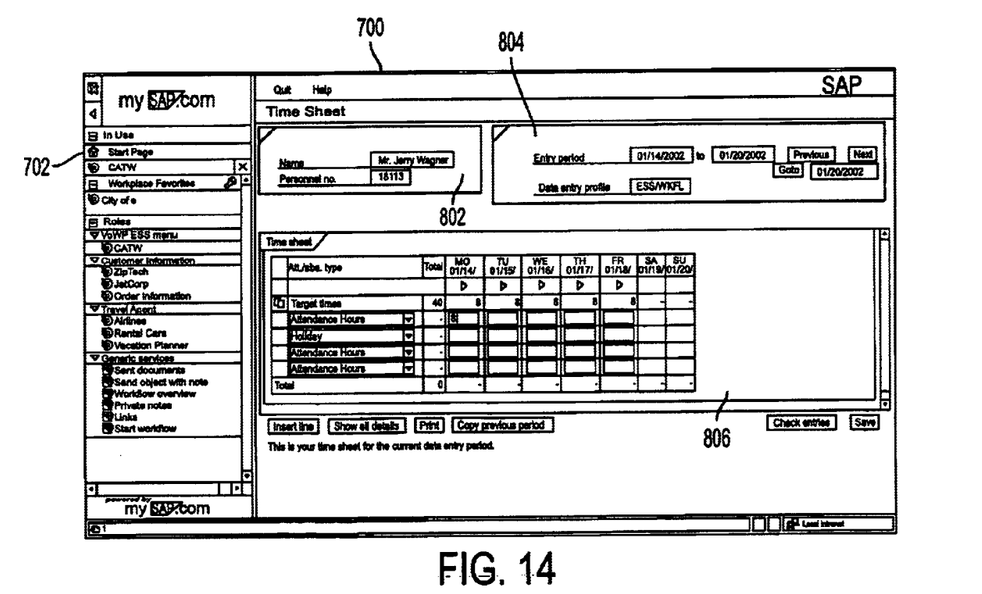

Referring to FIG. 14, the user makes a selection by saying "holiday" and the system updates the combo box value accordingly. The combo box then closes and focus is returned to display area 704. The user then may enter time corresponding to the newly selected time category using the technique described above with respect to FIGS. 9–11.

Figure 15:
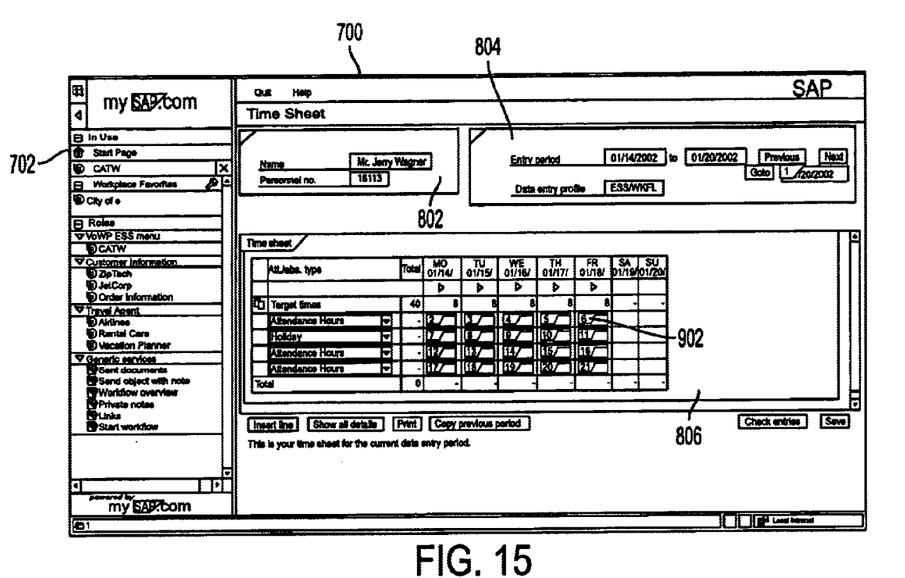
Figure 16:
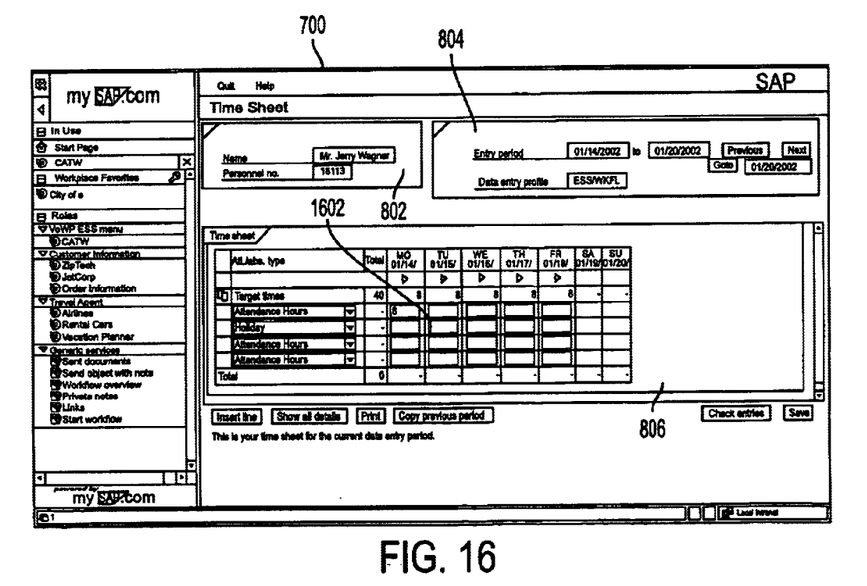

Referring to FIG. 15, the user says "text field" to enter time in time entry component 806. Because the target is ambiguous, representational enumerated labels 902 are displayed to allow the user to explicitly resolve any ambiguity. In this example, the user wishes to enter time in the holiday category for the second day.

Referring to FIG. 13, the user selects a combo box by speaking the number of the corresponding representational enumerated label 902 (as shown in FIG. 12). In this example, the user speaks "two," the labels are removed, and the second combo box is opened for data entry, displaying the list of choices selectable by the combo box. The user may then select the desired choice by reading the desired choice.

Figure 17:
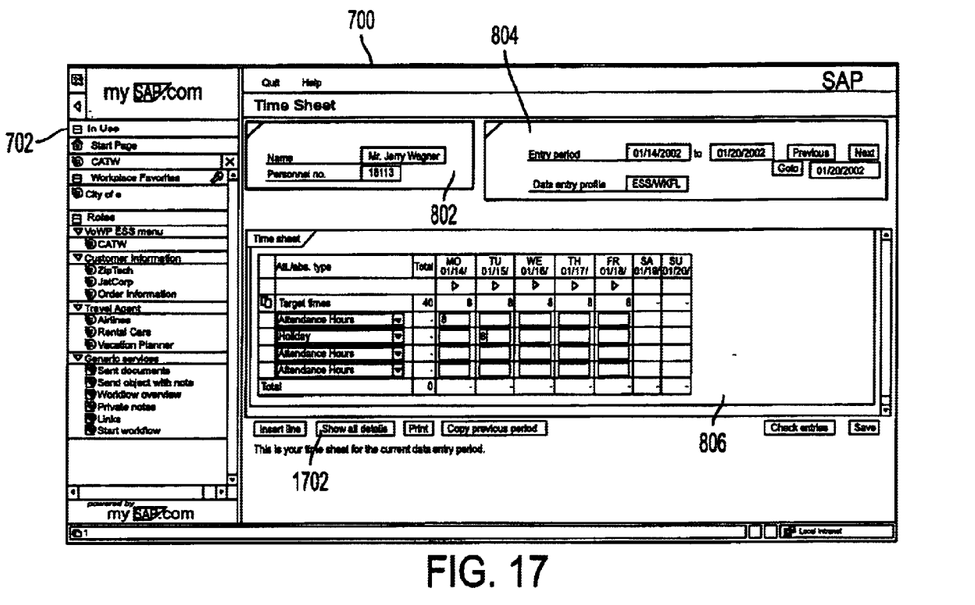

Referring to FIG. 17, the user then says "eight" to enter eight hours of holiday time on the second day of the time period. After the data is entered, the system exits data entry mode and focus is returned to display area 704.

Figure 18:
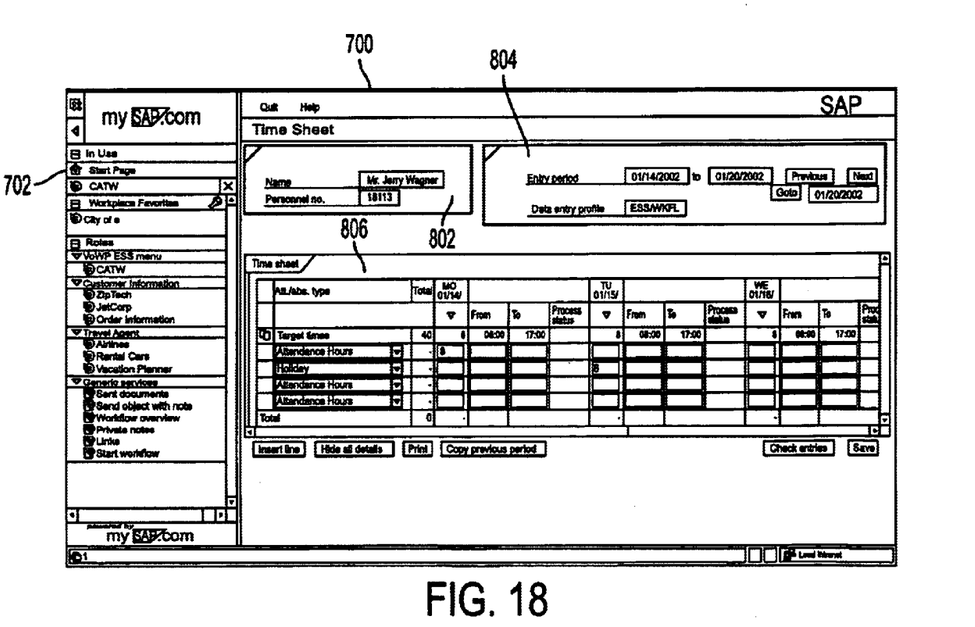

Referring to FIG. 18, the user may select buttons by reading their printed labels. For example, the user may say "Show All Details" to activate the corresponding button 1702 at the bottom of the display area 704. The system then displays detailed information as shown in FIG. 18. The user may return to the previous screen by saying "Hide All Details."

FIGS. 7–18 illustrate a voice interface for an electronic timekeeping system using visual cues, implicit scoping, and representational enumerated icons to improve user interactions with the system. The same techniques may be used to provide voice input and control in any graphical user interface.

A number of implementations have been described. Nevertheless, it will be understood that various modifications may be made without departing from the spirit and scope of the invention. Accordingly, other implementations are within the scope of the following claims.

What is claimed is:

1. A voice-enabled user interface comprising:
   user interface elements; and
   a speech recognition engine that receives voice input identifying a target user interface element,
   wherein the voice-enabled user interface resolves nonverbal ambiguities in associating the received voice input with the target user interface element by displaying a representational enumerated label associated positionally with the target user interface element after the voice input is received.

2. The voice-enabled user interface of claim 1 wherein the user interface elements include one or more from the list consisting of:
   combo box;
   text field;
   list box;
   button;

text area;

check box; and radio buttons.

3. The voice-enabled user interface of claim 1 wherein the speech recognition engine receives voice input identifying a category of user interface elements.

4. The voice-enabled user interface of claim 1 wherein the representational enumerated labels are semi-transparent.

5. The voice-enabled user interface of claim 1 wherein the representational enumerated labels are opaque.

6. The voice-enabled user interface of claim 1 wherein the voice-enabled user interface resolves the non-verbal ambiguities using implicit scoping.

7. The voice-enabled user interface of claim 6 wherein the user interface elements are divided into one or more groups, and implicit scoping includes prioritizing the one or more groups.

8. The voice-enabled user interface of claim 7 wherein each of the one or more groups represents a screen area.

9. The voice-enabled user interface of claim 8 wherein the visual cues include a colored highlight.

10. The voice-enabled user interface of claim 9 wherein the colored highlight surrounds a user interface element.

11. The voice-enabled user interface of claim 1 wherein the voice-enabled user interface resolves the non-verbal ambiguities using visual cues.

12. A representational enumerated label for resolving non-verbal ambiguities in a voice-enabled interface, the label comprising:

a unique identifier;

an association to a corresponding user interface element; and a graphical representation presented in the voice-enabled interface to show the association to the corresponding user interface element;

wherein the unique identifier may be displayed after a voice input is recognized to resolve non-verbal ambiguities in associating the recognized voice input with the user interface element.

13. The representational enumerated label of claim 12 wherein the unique identifier is a number.

14. The representational enumerated label of claim 12 wherein the unique identifier is a letter.

15. The representational enumerated label of claim 12 wherein the unique identifier is an icon.

16. The representational enumerated label of claim 12 wherein the unique identifier is a character.

17. The representational enumerated label of claim 12 wherein the unique corresponding user interface element includes one or more from the group consisting of:

combo box;

text field;

list box;

button;

text area;

check box; and radio buttons.

18. The representational enumerated label of claim 12 wherein the graphical representation is semi-transparent.

19. The representational enumerated label of claim 12 wherein the graphical representation is opaque.

20. The representational enumerated label of claim 12 wherein the graphical representation is overlaid on the corresponding user interface element.

21. A method for resolving target ambiguity in a voice-enabled user interface comprising:

receiving first voice input that identifies more than one potential target user interface element based on an ambiguity of the user interface to present a target ambiguity;

displaying representational enumerated labels corresponding to each potential target user interface element after the first voice input is received, each representational enumerated label including positional association to a corresponding target user interface element and a unique identifier; and receiving second voice input including the unique identifier of one of the representational enumerated labels to resolve the target ambiguity.

22. The method of claim 21 wherein receiving the first voice input includes receiving voice input identifying a category of ambiguously indicated user interface elements.

23. The method of claim 22 wherein the category of ambiguously indicated user interface elements includes one or more from the group consisting of:

combo box;

text field;

list box;

button;

text area;

check box; and radio buttons.

24. The method of claim 21 wherein displaying representational enumerated labels corresponding to each potential target user interface element includes overlaying a graphical representation on each potential target user interface element.

25. The method of claim 24 wherein the graphical representation is semi-transparent.

26. The method of claim 24 wherein the graphical representation is opaque.

27. The method of claim 21 wherein each of the representational enumerated labels further includes;

a graphical representation presented in the voice-enabled interface to show the spatial association to the corresponding target user interface element.

28. The method of claim 27 wherein the unique identifier is a number.

29. The method of claim 27 wherein the unique identifier is letter.

30. The method of claim 27 wherein the graphical representation is semi-transparent.

31. The method of claim 27 wherein the graphical representation is opaque.

32. A voice-enabled user interface comprising:

a user interface element configured to influence voice input of a user by providing a visual cue indicative to the user of a grammar associated with the user interface element;

an input handler that enables the user to specify the grammar to be associated with the user interface element;

a data store configured to store the association between the user interface element and the grammar; and a speech recognition engine that receives voice input identifying the user interface element, queries the data store to determine the grammar associated with the user interface element, and processes data input using the determined grammar.

33. The voice-enabled user interface of claim 32 wherein the data store is accessible by a single user.

34. The voice-enabled user interface of claim 32 wherein the data store is accessible by multiple users.

35. The voice-enabled user interface of claim 34 wherein the user may use the input handler to associate a data entry field of the user interface element with the grammar in the data store for access by the multiple users.

36. The voice-enabled user interface of claim 32 wherein the voice-enabled user interface displays visual cues with the target user interface element.

37. The voice-enabled user interface of claim 32 wherein the visual cue identifies a data type associated with the user interface element.

38. The voice-enabled user interface of claim 36 wherein the visual cues identify a grammar associated with the target user interface element.

39. A voice-enabled user interface comprising:

user interface elements; and a speech recognition engine that receives voice input identifying a target user interface element, wherein the voice-enabled user interface resolves ambiguities in associating the received voice input with the target user interface element using implicit scoping.

40. The voice-enabled user interface of claim 39 wherein the user interface elements are divided into one or more groups, and implicit scoping includes prioritizing the one or more groups.

41. The voice-enabled user interface of claim 40 wherein each of the one or more groups represents a screen area.

* * * * *